(12) United States Patent
Wang (10) Patent No.: US 12,262,083 B2
(45) Date of Patent: Mar. 25, 2025

(54) USER PRESENCE BASED MEDIA MANAGEMENT

(71) Applicant: Dell Products L.P., Round Rock, TX (US)

(72) Inventor: Kai Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/861,922

(22) Filed: Jul. 11, 2022

(65) Prior Publication Data

US 2023/0403428 A1 Dec. 14, 2023

(30) Foreign Application Priority Data

Jun. 10, 2022 (CN) .......................... 202210659204.0

(51) Int. Cl.
*H04N 21/442* (2011.01)
*G06F 1/3231* (2019.01)
*G11B 27/00* (2006.01)
*H04N 21/443* (2011.01)

(52) U.S. Cl.
CPC ..... *H04N 21/44218* (2013.01); *G06F 1/3231* (2013.01); *G11B 27/005* (2013.01); *H04N 21/4436* (2013.01)

(58) Field of Classification Search
CPC ......... H04N 21/44218; H04N 21/4436; H04N 23/67; H04N 23/681; H04N 23/6812; H04N 21/4223; H04N 21/42203
USPC .......................................................... 725/12
See application file for complete search history.

(56) References Cited

U.S. PATENT DOCUMENTS

| | | | |
|---|---|---|---|
| 11,260,288 B2 | 3/2022 | Seibert et al. | |
| 11,659,225 B2* | 5/2023 | Anguiano | H04N 21/4331 725/34 |
| 2009/0052859 A1* | 2/2009 | Greenberger | G11B 31/003 386/213 |
| 2010/0250985 A1* | 9/2010 | Gupta | G06F 1/3231 726/19 |
| 2011/0206353 A1* | 8/2011 | Yeo | H04N 21/44218 348/730 |
| 2011/0321143 A1* | 12/2011 | Angaluri | H04N 21/42201 340/5.2 |
| 2013/0011114 A1* | 1/2013 | Tashiro | G11B 27/105 386/230 |
| 2014/0002358 A1* | 1/2014 | Bruwer | G06F 3/03547 345/158 |
| 2014/0223461 A1* | 8/2014 | Hatambeiki | H04N 21/4415 725/10 |

(Continued)

OTHER PUBLICATIONS

B. Mrazovac, M. Z. Bjelica, I. Papp and N. Teslic, "Smart Audio/Video Playback Control Based on Presence Detection and User Localization in Home Environment," 2011 Second Eastern European Reg Conf on the Eng of Comp Based Systems, Bratislava, Slovakia, 2011, pp. 44-53, doi: 10.1109/ECBS-EERC.2011.16 (Year: 2011).*

*Primary Examiner* — Cynthia M Fogg
(74) *Attorney, Agent, or Firm* — Larson Newman, LLP (57) ABSTRACT

An information handling system may detect media playback, collect data from a user presence device, and determine user presence relative to the information handling system based on the data from the user presence device. The system may also apply a policy based on the user presence by adjusting a setting associated with the media playback.

20 Claims, 7 Drawing Sheets

(56) References Cited

U.S. PATENT DOCUMENTS

| | | | |
|---|---|---|---|
| 2016/0127765 A1* | 5/2016 | Robinson | H04N 21/4542 |
| | | | 725/12 |
| 2017/0085942 A1* | 3/2017 | Parmar | H04N 5/76 |
| 2019/0012902 A1* | 1/2019 | Kumar | G08B 3/10 |
| 2019/0020761 A1* | 1/2019 | Golden | H04M 3/4938 |
| 2019/0191214 A1* | 6/2019 | Mandavilli | H04N 21/454 |
| 2019/0325035 A1* | 10/2019 | Sagui | G06F 16/4387 |
| 2020/0120384 A1* | 4/2020 | Armaly | H04N 21/44008 |
| 2021/0064401 A1* | 3/2021 | Vichare | G06F 9/44505 |
| 2021/0089108 A1 | 3/2021 | Iyer et al. | |
| 2021/0089109 A1 | 3/2021 | Iyer et al. | |
| 2022/0148592 A1* | 5/2022 | Maury | G10L 15/22 |
| 2023/0003880 A1* | 1/2023 | Ding | G01S 15/04 |
| 2023/0087963 A1* | 3/2023 | Doken | H04N 21/43615 |
| | | | 725/12 |
| 2023/0214580 A1* | 7/2023 | Baughman | G06F 40/263 |
| | | | 704/8 |

* cited by examiner

USER PRESENCE BASED MEDIA MANAGEMENT

FIELD OF THE DISCLOSURE

The present disclosure generally relates to information handling systems, and more particularly relates to user presence based media management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may detect media playback, collect data from a user presence device, and determine user presence relative to the information handling system based on the data from the user presence device. The system may also apply a policy based on the user presence by adjusting a setting associated with the media playback.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
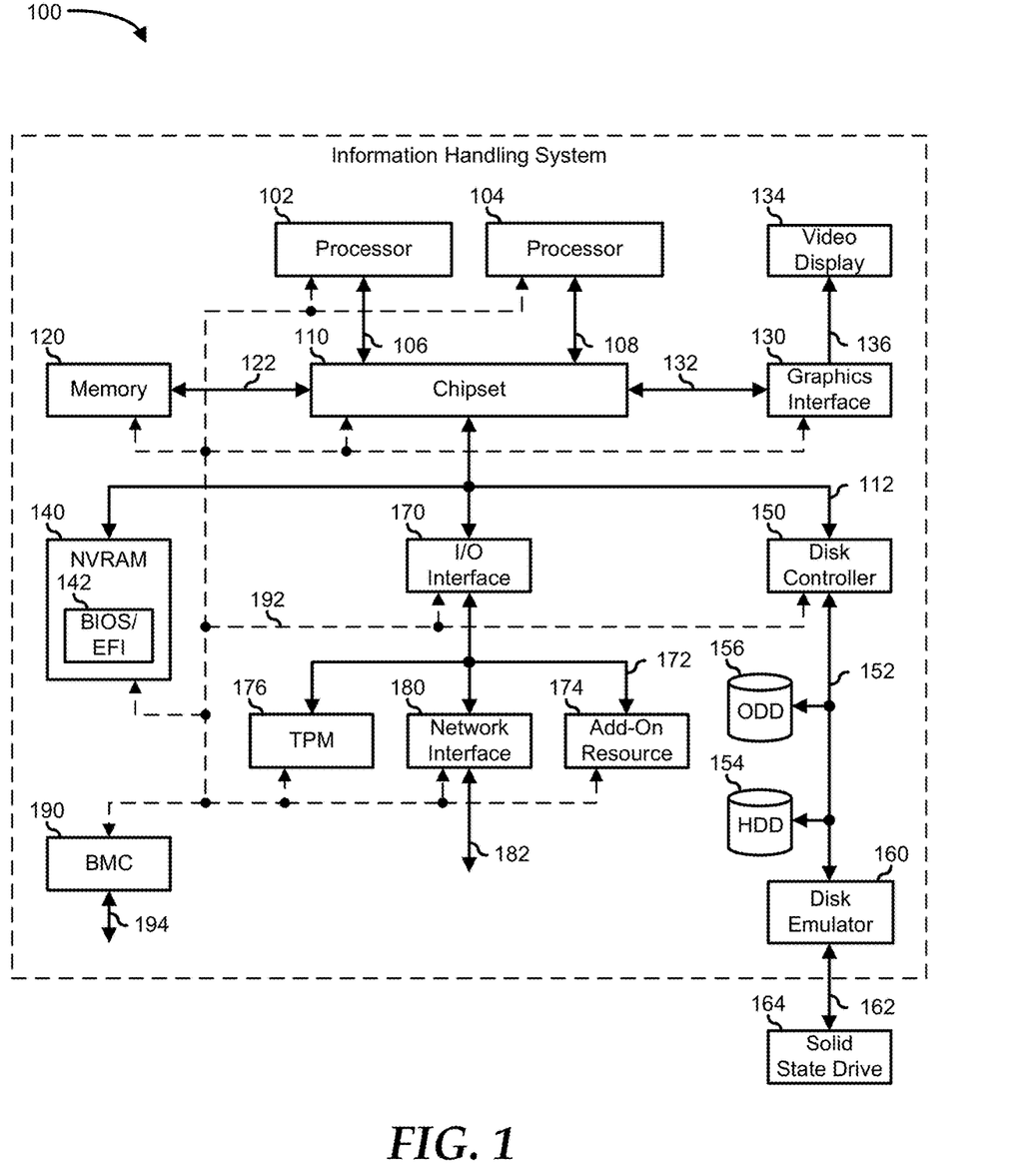
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to the NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Previously, when a user watched a media playback but stepped or looked away from the display screen temporarily, the user had to manually pause the media playback by clicking a button or icon. When the user came or looked back at the display screen to continue watching the media playback, the user may have had to manually reset the position of the video back to when he or she decided to step or look away from the screen. A similar scenario is typically encountered by a gamer playing a video game or an employee using a teleconference application. For example, the gamer may lose the video game when he or she looks away from the screen or temporarily walks away as the game continues without the gamer pausing the video game. Similarly, the employee had to manually put the teleconference application on hold or mute the same while the employee attended to another task, or looked or walked away from the screen. In another example, after a certain period during a long media playback, a video currently playing may pause asking whether the user is still watching the video. The user has to interact with the media application by clicking the button or icon for the media playback to continue.

In addition to these problems, because the display device or screen of an information handling system tends to consume a lot of power, the system incurs unnecessary power consumption during the media playback. As such, the battery of mobile information handling systems wears down faster if the media playback, video game, or teleconference is not paused and the system put in a power saving mode. Accordingly, it is advantageous for the media playback to continue while the user is present but automatically pause during the user's absence. Thus, the present disclosure provides a system and method to automatically detect the presence of the user and manage media such as by adjusting the media playback and power consumption accordingly.

Figure 2:
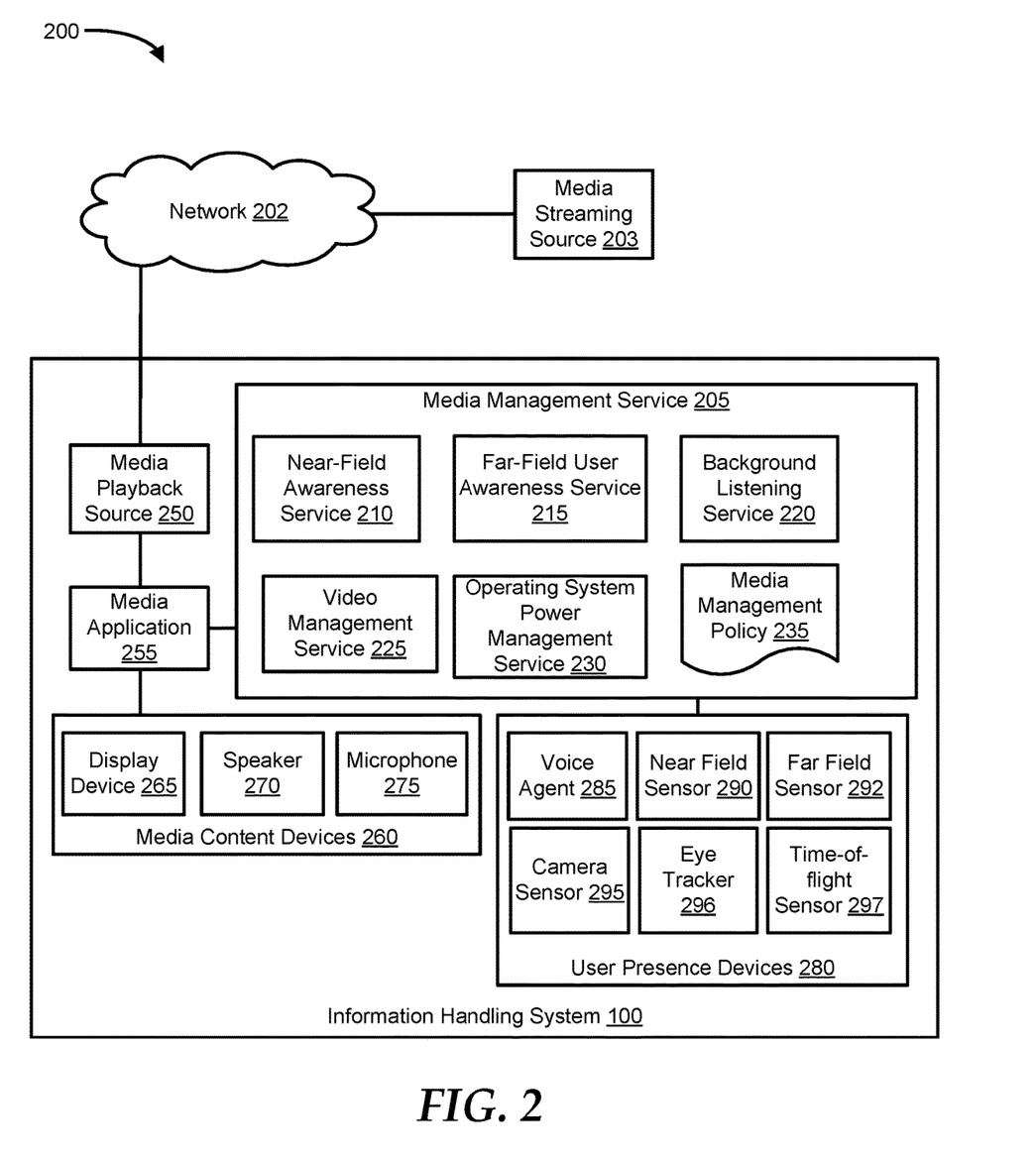
FIG. 2 is a block diagram illustrating an example of a system for user presence based media management, according to an embodiment of the present disclosure.

FIG. 2 shows a system 200 for user presence based media management. System 200 includes information handling system 100, a network 202, and a media streaming source 203. Information handling system 100 includes a media management service 205, a media playback source 250, a media application 255, media content devices 260, and user presence devices 280. Media management service 205 includes a near-field user awareness service 210, a far-field user awareness service 215, a background listening service 220, a video management service 225, and an operating system power management service 230. The components of system 200 may be implemented in hardware, software, firmware, or any combination thereof. The components shown are not drawn to scale and system 200 may include additional or fewer components. In addition, connections between components may be omitted for descriptive clarity.

Media management service 205 may be configured to manage media based on information from a first set of services and one or more media management policies. Media management is performed to optimize user experience, increase user productivity, and optimize power consumption of information handling system 100. The first set of services includes near-field user awareness service 210, far-field user awareness service 215, background listening service 220, etc. Media management service 205 may determine one or more actions based on one or more media management policies, such as media management policy 235, and use a second set of services, such as video management service 225, operating system power management service 230, a video game control service, a teleconference control service, a conference call service, etc. to apply those actions.

The actions to be applied may include adjusting one or more settings associated with the media currently being played or streamed. For example, settings associated with media content devices may be adjusted, such as increasing, decreasing, or muting the volume of speaker 270, dimming the display screen of display device 265, or muting microphone 275. These actions may be performed on various media playback sources and/or applications, such as to video, music, video game, podcast, teleconference, video phone call, etc. The actions may also include optimizing the power consumption of information handling system 100 by performing power saving options such as putting information handling system 100 to sleep or hibernation while the user is away. In addition, the action may also provide security measurements such as locking the display screen or dimming the display screen when another user is present and the media content currently displayed is deemed confidential.

The data from one or more of the first set of services may be used to determine the user presence status, such as whether the user is present or absent relative to information handling system 100. In addition, the data may be used to determine the user presence state and/or user behavior with respect to information handling system 100. The user presence state may be based on the location of the user based on the information handling system, such as whether the user is inside a near-field range or far-field range and/or whether there are multiple users in the near-field range or far-field range, etc. The user behavior may be based on the action of the user respective to the media content such as whether the user is gazing at the display screen, whether the user is actively moving away or moving towards information handling system 100, or whether the user is performing a body movement such as a hand gesture, etc.

Media management policy 235 may include one or more rules to manage settings, security, and/or power consumption of media application 255 based on one or more parameters associated with user presence and/or absence including user presence state and behavior and applies one or more actions accordingly. For example, media management policy 235 can dim or turn off display device 265 when the user is disengaged or not present in front of display device 265. In another example, media management policy 235 may lock the information handling system 100 and direct it to a sleep mode or a low power state when user absence is detected. Accordingly, when the user presence is detected, media management policy 235 may wake up the information handling system from the sleep mode or the low power state and enables facial recognition.

Near-field user awareness service 210 may be configured to communicate with one or more user presence devices 280 such as near-field sensor 290 and assess the user presence status, the user presence state, and/or user behavior. For example, near-field user awareness service 210 may collect and/or receive data output such as a signal and/or sensor data from near-field sensor 290. Near-field user awareness service 210 may process the data output such as encode, decode, transmit, filter, and/or cache all or a portion of the data to determine whether the user is present within the near-field range and/or, the user is gazing or gesturing at display device 265, etc.

Far-field user awareness service 215 may be configured to communicate with one or more user presence devices such as far-field sensor 292 and assess the user presence status, the user presence state, and/or user behavior. For example, far-field user awareness service 215 may collect and/or receive data output such as a signal and/or sensor data from far-field sensor 292. Far-field user awareness service 215 may process the data output such as encode, decode, transmit, filter, and/or cache all or a portion of the data to determine whether the user is within the far-field range of information handling system 100, whether the user is walking away or walking back, etc.

Background listening service 220 may be configured to communicate with one or more user presence devices 280 such as voice agent 285. For example, background listening service 220 may collect and/or receive output such as a signal and/or sensor data from voice agent 285. Background listening service 220 may process the sensor data such as encode, decode, transmit, filter, and/or cache all or a portion of the sensor data to determine whether the user is on a phone call. Background listening service 220 may also determine whether there are one or multiple users within a particular range such as near-field range and/or far-field range. The voice agent may also be used to detect a keyword and may include a software keyword spotter, a hardware keyword spotter, and a device driver interface that may be configured to support multiple voice agents. For example, a voice agent may be located in the proximity of the near-field range and another voice agent may be located in the proximity of the far-field range.

Video management service 225 may be configured to adjust the one or more settings of media application 255 based on the user presence status, user presence state, and user behavior according to media management policy 235. For example, video management service 225 may pause the media content currently playing/streaming when the user moves away from information handling system 100. Video management service 225 may also resume the media playback/streaming once it determines that the user is in front of display device 265. As used herein, media playback includes media streaming. Video management service 225 may also rewind the video to the point when the user moved away, such that the user may not miss a portion of the video.

Operating system power management service 230 may be configured to adjust different settings such as the brightness of display device 265, speaker volume, speaker beam steering, microphone beamforming, power settings, etc. according to media management policy 235. For example, operating system power management service 230 may be configured to dim display device 265 when it receives information that the user is away from information handling system 100 and increase the brightness of the display screen when user presence is detected. In another example, operating system power management service 230 may put information handling system 100 into lower power consumption mode, such as sleep or hibernation mode, when it receives information that the user has been away for a certain period and restore to normal power consumption and enable facial recognition when the user presence is detected.

Media playback source 250 includes local media files or content such as audio, video, image, video game, teleconference, etc., and a combination thereof. Media playback source 250 includes media files or media content locally accessible to information handling system 100 while media playback source are accessible via network 202. Media content includes any data, text, sounds, images, graphics, music, photographs, or advertisement and may also include video, audio, streaming content, webcasts, podcasts, blogs, online forums, and chat rooms. Media application 255 may be configured to support the media content such as playback and control. For example, media application 255 may include APIs to start, pause, resume, seek, and stop media playback of a video and/or audio file. Media application 255 may be a local media player or stream the video via various applications such as Netflix®, Hulu®, or similar. In certain embodiments, network 202 may be a public network, such as the Internet, a physical private network, a wireless network, a virtual private network, or any combination thereof.

Media content devices 260 include local and/or peripheral devices capable of receiving media content and providing media output such as visual and/or audio output. Media content devices 260 include a display device 265, a speaker 270, and a microphone 275. Other functions and features of user presence devices 280 are known in the art and will not be further disclosed herein, except as needed to illustrate the various embodiments disclosed herein. Display device 265 may be any type of dynamic display device capable of displaying images, video content, and/or graphical user interfaces on a display screen and may include any type of light-emitting diode (LED), organic LED, liquid crystal display, electroluminescence, or other display technology. In this example, display device 265 is used by information handling system 100 to provide a visual output related to media application 255. Display device 265 may be physically connected or affixed to information handling system 100 or be communicatively connected to it via one or more cables and/or intermediary components such as a docking station.

Speaker 270 may be any type of audio playback transducer, such as a loudspeaker, a headphone, earbuds, and the like. Speaker 270 may include a single monophonic audio output device, a pair of devices to provide a stereo output or additional devices to provide surround-sound effects. Video management service 225 may increase the volume of speaker 270 upon receipt of a data output from background listening service 220 that the user has moved away from information handling system 100. Speaker beam steering can be used to improve the fidelity of sound based on the location and/or gaze direction of the user. For example, operating system power management service 230 may utilize speaker beam steering to direct the sound towards the location of the user, such as towards a particular direction of the user within the near-field range or the far-field range around information handling system 100, such that the user may hear the sound better.

Microphone 275 may be any type of audio transducer capable of converting sound waves into electrical signals and may include a microelectromechanical system device or another type of audio capturing device. For example, microphone 275 may be used by the user to answer or originate a call (such as a phone call or conference call), to talk to other players when the user is playing a video game, participate in a conference call (such as an audio or video conference) and the like. Microphone 275 may be stand-alone or may be attached to another device such as a headphone. Accordingly, microphone 275 may be used to detect whether the user is speaking. If the user is speaking, media management service 205 may pause the video and/or audio content until the user stops speaking. Microphone 275 may include a single microphone, a stereo pair of microphones, or an array of microphones. Microphone beamforming can be used to improve the fidelity of signals received from microphone 275 based on the location and/or gaze direction of the user. For example, operating system power management service 230 may utilize microphone beamforming to be more sensitive to sound where the user is currently located, such as to a particular direction within a near-field range or a far-field range, such that other participants in a conference call may hear the user better.

User presence devices 280 include a voice agent 285, a near-field sensor 290, a far-field sensor 292, a camera sensor 295, an eye tracker 296, and a time-of-flight sensor 297. Other devices that may be used to detect the user presence status, user presence states, or user behavior, such as radar, magnetic, capacitive, inductive sensors or similar may be included. For example, user presence devices 280 may include a visual sensor, such as Emza WiseEye® visual sensor, which may be configured to pick up a two-dimensional image of the object being measured. Each of the user presence devices 280 may be communicatively coupled to media management service 205 or its component through wireless local area networks such as 802.11 b, g, n, and ac networks, through wireless personal area networks such as Bluetooth or 802.11 ad networks, or other communication networks. User presence devices 280 may communicate an output such as a signal and/or a data stream in various formats to the media management service. For example, the stream of data may be in Extensible Markup Language™, JavaScript Object Notation™, or other formats. Other functions and features of user presence devices 280 are known in the art and will not be further disclosed herein, except as needed to illustrate the various embodiments disclosed herein.

Ranging and proximity sensors, such as near-field sensor 290, a mid-field sensor, and a far-field sensor 292 may include any system, device, or apparatus configured to detect the presence, the gaze of the user, and other parameters such as the direction of movement, size, and speed. The ranging and proximity sensors may communicate a data output such as signal, data stream, or both to media management service 205. Near-field sensor 290 may provide ranging and proximity sensing of user presence at a first range around the information handling system and other parameters such as the direction of movement, size, and speed. Near-field sensor 290 may communicate output to near-field user awareness service 210 using a near-field communication protocol. Near-field sensor 290 may be one sensor or a combination of multiple sensors that include a proximity sensor, a time-of-flight (TOF) sensor, an eye tracker, a charge to voltage sensor, a visual sensor, and a motion sensor, etc.

Far-field sensor 292 may provide ranging and proximity sensing of user presence in a second range which may be further than the first range around the information handling system and other parameters such as the direction of movement, size, and speed. Far-field sensor 292 may communicate output such as a signal or a stream of data to far-field user awareness service 215. Far-field sensor 292 may be one sensor or a combination of multiple sensors that include a camera, Bluetooth user presence sensor, Bluetooth low energy user presence sensor, etc. Similarly, a mid-field sensor may provide ranging and proximity sensing of user presence in a third range which may be between the first range and the second range.

Time-of-flight sensor 297, such as FlightSense® TOF ranging sensor sense, may be configured to detect the movement of the user in addition to user presence and absence. In particular, the TOF sensor may be configured to scan infrared energy in a pattern at an expected user location and measure reflections to detect objects. In addition, the TOF sensor may enable facial recognition and can distinguish a person sitting in front of display device 265 of information handling system 100 from an inanimate object, such as a chair.

Eye tracker 296 may be configured to measure eye movements to determine where the user is looking, what the user is looking at, and for how long the user is gazing at a particular spot. Eye tracker 296 may use a near-infrared light and/or high definition camera to record the direction it is reflected off the cornea and calculate the position of the eye to determine where it is focused. Camera sensor 295 may be configured to detect user presence and/or focus based on one or more signals or data streams from a camera. Camera sensor 295 may be one of the charge-coupled devices, electron-multiplying charge-coupled devices, complementary metal-oxide-semiconductor (CMOS), back-illuminated CMOS, or similar.

Figure 3:
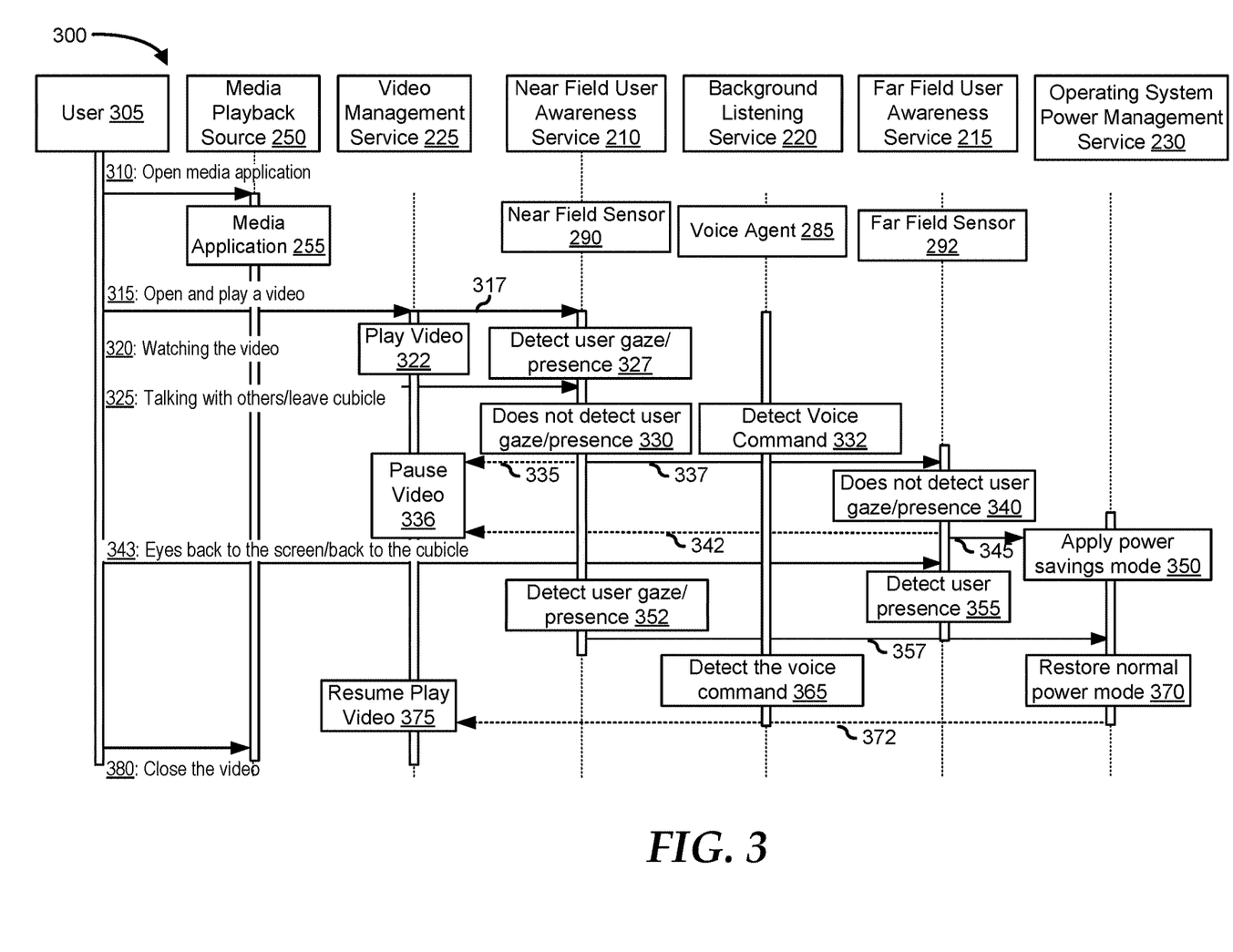
FIG. 3 is a sequence diagram for user presence based media management, according to an embodiment of the present disclosure

FIG. 3 shows a sequence diagram 300 for user presence based media management. The sequence diagram illustrates actions taken and/or messages transmitted between objects such as user 305, media playback source 250, video management service 225, near-field user awareness service 210, far-field user awareness service 215, background listening service 220, and operating system power management service 230. Sequence diagram 300 is an example of interaction between one or more objects and those of ordinary skill in the art will appreciate that the sequence of interaction between the objects may vary. In addition, sequence diagram 300 may include more or fewer objects and/or more or less interactions than depicted.

At 310, user 305 may open media application 255 to play media playback source 250. At 315, user 305 may click a button and/or press an icon at media application 255 to play media playback source 250 which may transmit a signal to video management service 225. At 322, video management service 225 may play the media playback source 250, also referred to in this figure simply as video, in response to the received signal. At 320, user 305 may continue watching the video. At 317, video management service 225 may transmit a message to near-field user awareness service 210 that the video is playing. Near-field sensor 290 may detect the presence or gaze of user 305 while user 305 is watching the video at 327.

At 325, user 305 may start talking to another user or move away from the cubicle. At 330, near-field sensor 290 no longer detect the gaze and/or presence of user 305 which may be communicated to or detected by near-field user awareness service 210. In response, at 335, near-field user awareness service 210 may transmit a message that the user's gaze and/or presence are not detected to video management service 225 which may pause the video at 336. At 337, near-field user awareness service 210 may also transmit a message that the user's gaze and/or presence are not detected to far-field user awareness service 215. Meanwhile, voice agent 285 may be configured to detect voice commands and/or whether there are multiple voices around information handling system 100 at 332.

At 340, far-field sensor 292 may scan for user 305 at which far-field user awareness service 215 may determine that it does not detect the presence and/or gaze of user 305 which it may communicate to video management service 225 at 342. This may be performed as a verification of 335. In response, video management service 225 may continue to pause the video at 336. Far-field user awareness service 215 may also communicate with operating system power management service 230 that it does not detect the gaze or the presence of user 305 at 345. In response, operating system power management service 230 may apply power savings mode, such as dimming the display screen and putting information handling system 100 into low power mode at 350.

At 343, user 305 may gaze back at the display screen and/or return to the cubicle as user 305 walks back to the cubicle, wherein far-field sensor 292 may detect user presence at 355. Near-field sensor 290 may also detect user presence at 352, which may be used to verify 355. At 357, near-field user awareness service 210 and/or far-field user awareness service 215 may communicate that the presence and/or gaze of user 305 has been detected to operating system power management service 230 which may then restore the brightness of the display screen and information handling system 100 to its normal power mode at 370. Voice agent 285 may be configured to detect the voice command at 365. In addition, operating system power management service 230 may send a signal to video management service 225 to resume playing the video at 372 which video management service 225 resumes at 375. User 305 may continue watching the video and/or play the video game until he or she closes the video at 380.

Figure 4:
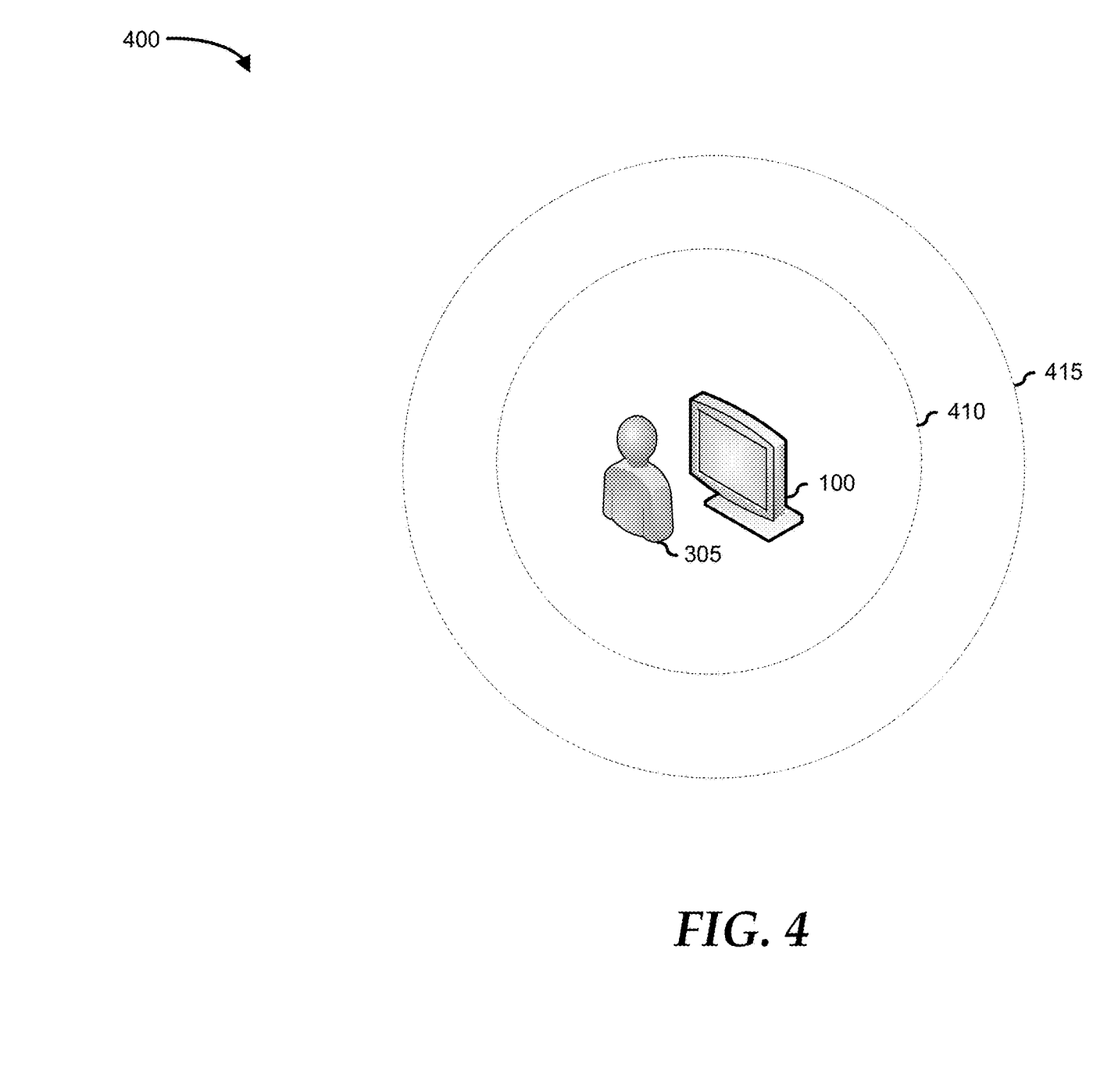
FIG. 4 is a diagram illustrating an environment of an information handling system for user presence based media management, according to an embodiment of the present disclosure.

FIG. 4 shows an environment 400 of field ranges associated with information handling system 100. Environment 400 includes a near-field range 410 and a far-field range 415 around information handling system 100 and user 305. Near-field range 410 may indicate the range of near-field sensor 290 of FIG. 2. Far-field range 415 may indicate the range of far-field sensor 292 of FIG. 2. Environment 400 may include the mid-field range which is between near-field range 410 and far-field range 415. Settings associated with managing the media content such as the volume of the media/audio content, an elapsed period of time before the microphone is muted, and distance of near-field range 410 and far-field range 415 from information handling system 100, etc. may be set according to a default or preset setting by user 305 or an administrator using an interface prior to or during media management service monitoring and/or managing media playback in information handling system 100.

In one embodiment, user 305 may be watching a media playback of a video or playing a video game using information handling system 100 while inside near-field range 410. While the media playback is currently running, user 305 may walk away or turn away from a display screen of information handling system 100. The system may detect the user presence state of user 305, such as whether user 305 is in front of display device 265, within near-field range 410, outside of near-field range 410 but within far-field range 415, or outside of far-field range 415. The system may also detect whether user 305 is looking at information handling system 100 while inside near-field range 410.

The media management service may apply a media management policy based on the user presence, absence, behavior, and/or user 305's location relative to a field range such as near-field range 410 and far-field range 415. The media management policy may also be based on the type of media content running. For example, when user 305 moves outside of the range of a far-field proximity sensor during media playback, user 305 may be deemed absent. Accordingly, the media management service may pause the media playback until user 305 is detected by the far-field proximity sensor to be inside far-field range 415. In another example, the media management service may continue to pause the media content until user 305 is detected by a near-field proximity sensor to be inside near-field range 410. In yet another example, the media management service may continue to pause the media content until user 305 is detected by a near-field proximity sensor to be inside near-field range 410 and looking at the display screen of information handling system 100. In addition, to pausing the media content, the display screen may be dimmed or turned off to save power until user 305 the media content is resumed by the media management service. The media management service may also provide a notification to user 304 that the media content has been paused.

In another embodiment, user 305 may be listening to an audio playback such as listening to music, podcast, or something similar, at information handling system 100. During the audio playback/streaming, user 305 may walk or turn away from the display screen of information handling system 100 while listening. As used herein, audio playback includes audio streaming. Similar to above, the media management service may detect the user presence state of user 305, such as whether user 305 is within near-field range 410, outside of near-field range 410 but within far-field range 415, or outside of far-field range 415. The media management service may also detect whether user 305 is looking at information handling system 100 while inside near-field range 310. In addition, the media management service may detect whether user 305 is talking on a phone or similar.

The media management service may adjust the output of the speaker based on the distance of user 305 from information handling system 100. For example, as user 305 moves outside of near-field range 410 towards far-field range 415, the media management service may increase the volume of the speaker and continues increasing the volume as the user goes further but still is inside far-field range 415. For example, the increase and/or decrease in volume may be proportional to the distance of the user from the information handling system or device. The volume may be adjusted up to a particular threshold, such as a suitable volume for the distance within hearing safety limits. The threshold may be a default preset or set by user 305 or an administrator. When user 305 is outside of far-field range 415, user 305 may be deemed absent and at this point may pause the audio playback. The reverse may happen as user 305 moves toward information handling system 100. For example, the media management service may resume playing the audio content at a particular volume when user 305 is detected inside far-field range 415 by the far-field proximity sensor. The volume of the audio content may get softer as user 305 gets nearer to information handling system 100. Similar to the above, the media management service may provide a notification that the audio content has been paused.

In yet another embodiment, user 305 may be participating in a video teleconference using information handling system 100. Typically, when the user is talking and moving/pacing the sound may not be consistent. For example, when the user moves closer to the device or information handling system the sound becomes louder. Accordingly, when the user moves away from the device or the information handling system, the sound becomes softer. Thus, user 305 may have difficulty hearing the other participants. In addition, the other participants may have difficulty hearing user 305. In this scenario, the media management service may dynamically adjust the output of the speaker and the input of the microphone of the information handling system based on the user presence and location, such as relative to near-field range 410 and far-field range 415, to ensure that other participants can hear user 305 and that user 305 can hear the other participants. In addition, the microphone may be muted by default when user 305 is not present for a certain period. Also, a notification setting associated with the status of user 305, such as available, busy, away, etc. may be provided to the other participants.

In an additional embodiment, user 305 may wish to pause the media content without pressing a button or clicking an icon for one reason or another, such as when user 305 is using his or her dominant hand for cooking, using a phone, etc. The media management service may be configured to detect hand gestures or track body motions such as nodding and accordingly apply a media management policy. The media management service may apply a different media management policy based on the location of user 305 and/or the type of media content currently playing. For example, the media management service may lower the volume, mute, or pause the media content in response to user 305 waving his or her other hand.

Figure 5:
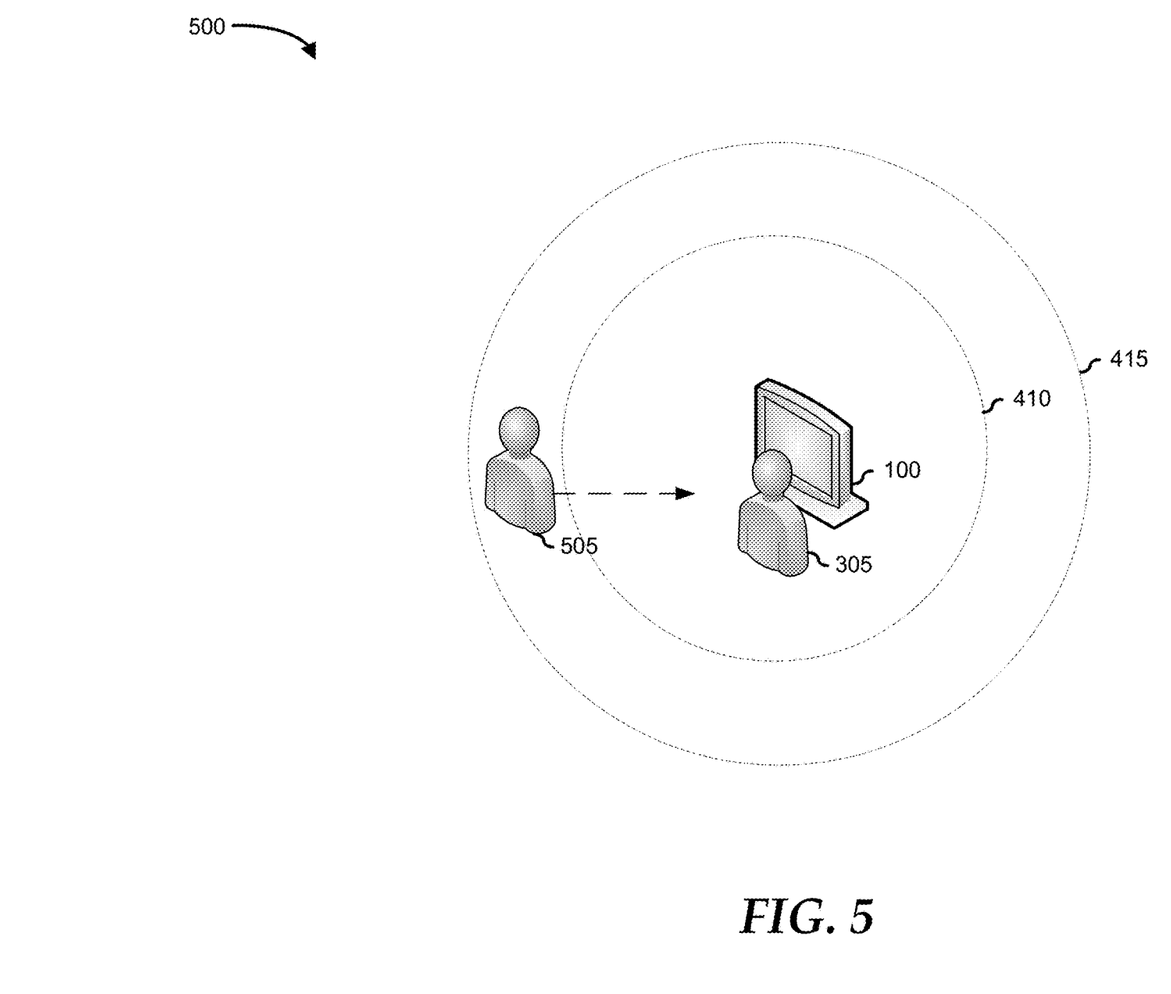
FIG. 5 is a diagram illustrating an environment of an information handling system for user presence based media management, according to an embodiment of the present disclosure.

FIG. 5 shows an environment 500 of field ranges associated with information handling system 100. Environment 500 includes a near-field range 410 and a far-field range 415 around information handling system 100. Environment 500 also includes user 305 and a user 505. In one embodiment, user 305 may be watching media content or listening to audio content at information handling system 100. Another user, such as user 505 may approach user 305 and as the far-field ranging and proximity sensor detects that user 505 is within far-field range 415, the media management service may perform one or more actions based on a set of policies. For example, a media management service may lower the volume of the speakers, and notify user 305 of the approach of user 505.

In addition, when the near-field proximity sensor detects that user 505 is within near-field range 410, the media management service may perform one or more actions based on another set of policies. For example, in addition to the actions performed when user 505 was detected in far-field range 415 stated above, the media management service may dim the display screen of information handling system 100, mute the speakers and microphone, and/or pause the media content for security.

Figure 6:
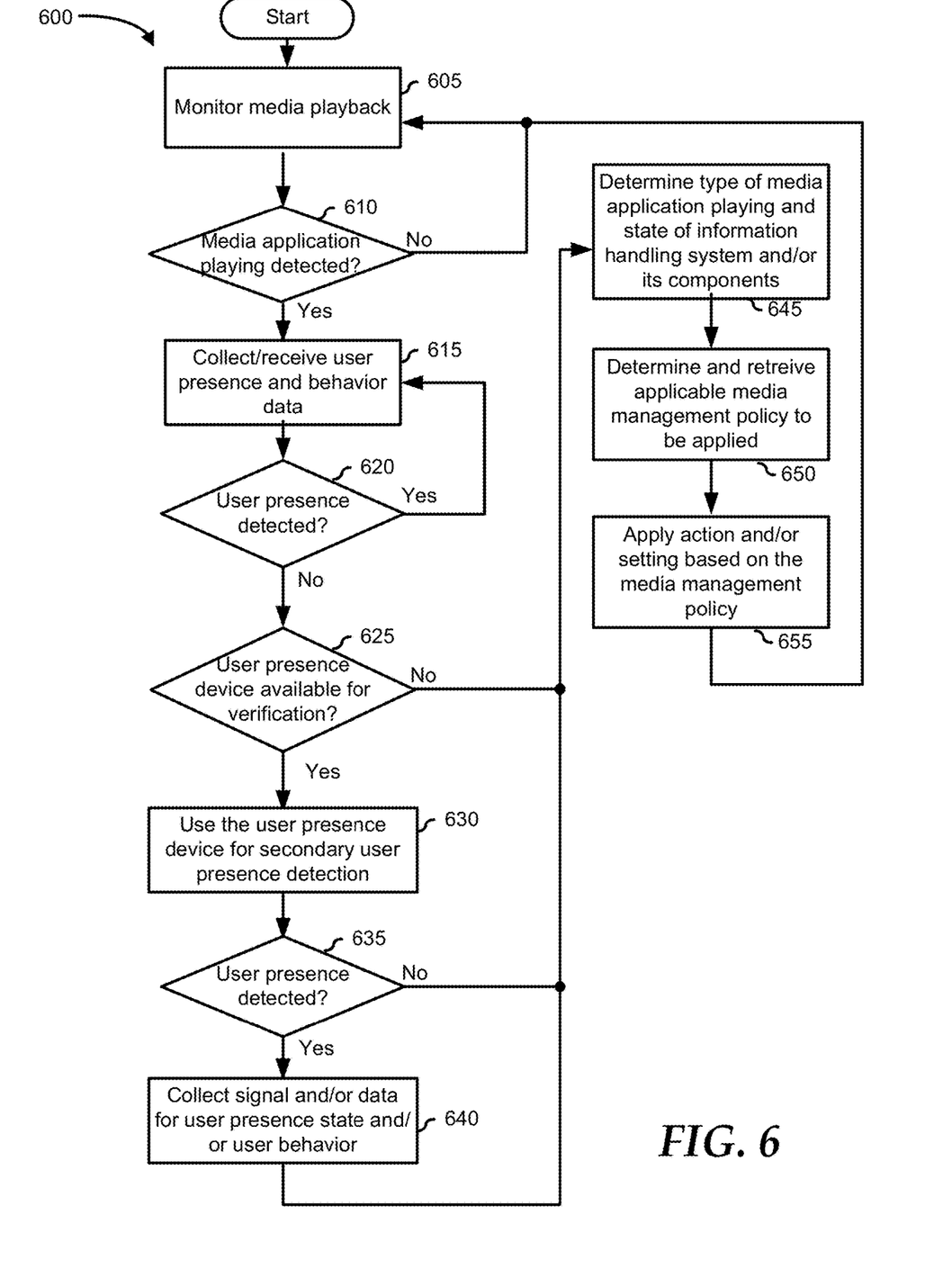
FIG. 6 is a flowchart illustrating a method for user presence based media management, according to an embodiment of the present disclosure.

FIG. 6 shows a method 600 for user presence-based media management. Method 600 may be performed by one or more components of system 200 such as media management service 205. However, while embodiments of the present disclosure are described in terms of media management service 205 of FIG. 2, it should be recognized that other systems may be utilized to perform the described method. One of skill in the art will appreciate that this flowchart explains a typical example, which can be extended to advanced applications or services in practice.

Method 600 may typically start at block 605 where the method monitors the information handling system for media playback. At decision block 610, the method determines whether a media playback is detected. If the media playback is detected, then the "YES" branch is taken and the method proceeds to block 615. If the media playback is not detected, then the "NO" branch is taken and the method loops back to block 605.

At block 615, the method may collect or receive data output associated with user presence and behavior from one or more sensors and user presence devices. The user presence includes user presence status and state. For example, the method may collect signals and/or sensor data from user presence devices 280 of FIG. 2. At decision block 620, the method determines whether the user is present. If the user is present, then the "YES" branch is taken and the method proceeds to block 615. If the user is not present, then the "NO" branch is taken and the method proceeds to decision block 625, where the method determines whether another user presence device such as a camera and/or sensor is available for verification. If a user presence device is available for verification, then the "YES" branch is taken and the method proceeds to block 630. If a user presence device is not available, then the "NO" branch is taken and the method proceeds to block 645.

At block 630, the method may turn on the user presence device and use it for secondary user presence verification. At decision block 635, the method may determine if the user presence is detected. If the user is detected, then the "YES" branch is taken and the method proceeds to block 640. If the user is not detected, then the "NO" branch is taken and the method proceeds to block 645. At block 640, the method may collect the signal and/or data from the sensor and camera to be used in determining the user presence state and/or user behavior.

At block 645, the method may determine the type of media and/or media content that the media application is playing/streaming. For example, the method may determine if the media application is associated with a video, video game, audio, teleconference, etc. At block 650, the method may determine and retrieve applicable media management policy to be applied based on the user presence status, user presence state, user behavior, and/or the type of media content that is playing. The media management policy may be retrieved from a data storage associated with the media management service, such as a database. For example, if the media content is an audio content, then the media management policy may include rules associated with speaker volume versus if the media content is associated with a video game, then the media management policy may include rules associated with microphone settings in addition to the volume of the speaker, and so on.

If the user is consuming multiple media content types, such as playing a video game while listening to music, then multiple media management policies may be determined and retrieved for each media type unless one media management policy covers the multiple media content types being consumed by the user. At block 655, the method may apply an action and/or adjust or update a setting based on the media management policy. For example, the method may pause the video that the user is watching. In another example, the method may lower the volume of the speaker. In another example, if the user is consuming multiple media content type, then the action and/or adjustment may be performed for each media content type.

Figure 7:
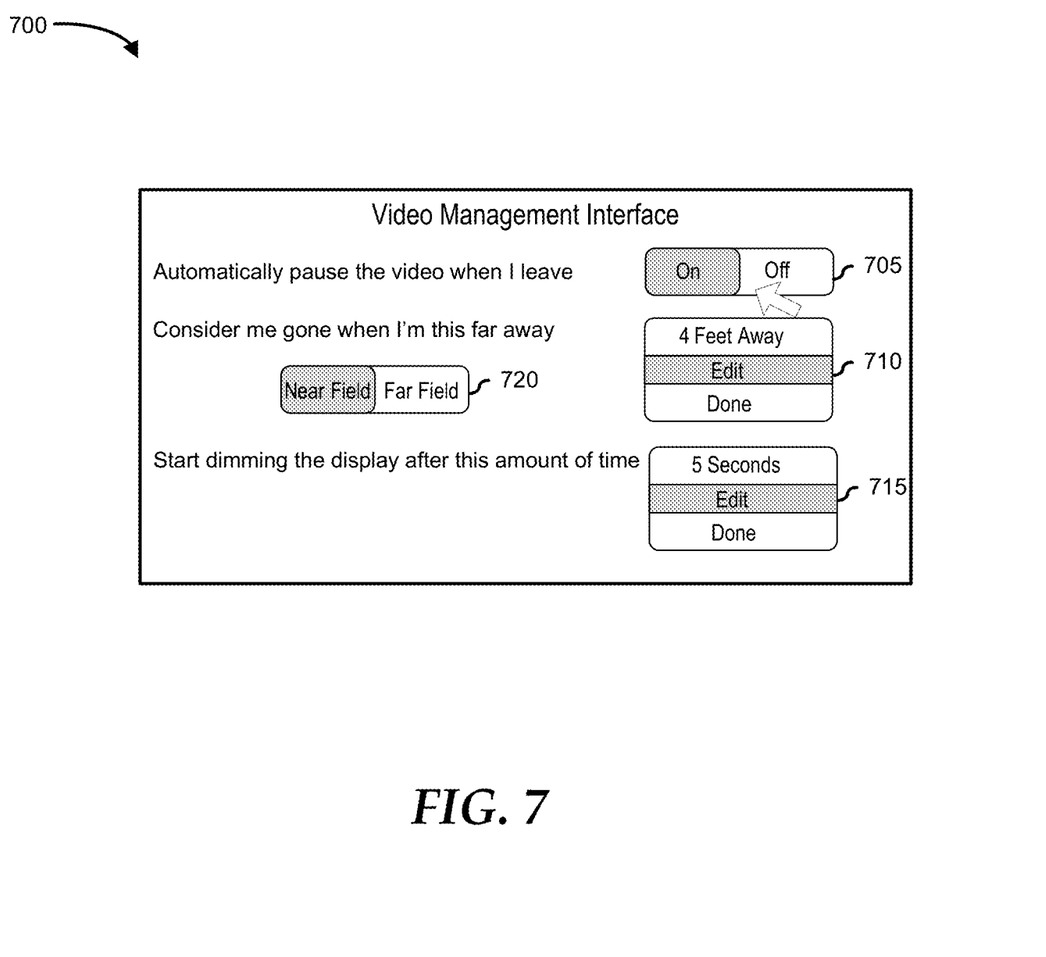
FIG. 7 is a diagram illustrating a graphical user interface for user presence based media management, according to an embodiment of the present disclosure.

FIG. 7 shows a graphical user interface 700 for user presence based media management. Graphical user interface 700 may be rendered and displayed to a user at a display device of an information handling system. Graphical user interface 700 includes several fields such as a toggle radio button 705, a text field 710, a text field 715, and a toggle radio button 720. The user can change the different fields to manage user presence detection. The user may have different fields based on media content type. In this example, the fields may be associated with managing video content. For example, by switching toggle radio button 705, the user can specify whether the video may be paused automatically. In addition, the user may determine the near-field range and/or far-field range via toggle radio button 720 and text field 710. In this example, the near-field range was set to four feet. In addition, the user may set the amount of time before a parameter takes effect. In this example, the video management interface may dim the display screen after five seconds using text field 715.

Although FIG. 6 shows example blocks of method 600 in some implementations, method 600 may include additional blocks, fewer blocks, different blocks, or differently arranged blocks than those depicted in FIG. 6. Those skilled in the art will understand that the principles presented herein may be implemented in any suitably arranged processing system. Additionally, or alternatively, two or more of the blocks of method 600 may be performed in parallel. For example, blocks 645 and 650 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
monitoring an information handling system, by a processor, to detect whether a media application is playing media content;
in response to detecting that the media application is playing the media content, collecting data from a plurality of sensors, wherein the sensors include a far-field sensor and a near-field sensor, wherein the near-field sensor provides proximity sensing at a first range around the information handling system, and wherein the far-field sensor provides proximity sensing at a second range around the information handling system;
determining user presence status within the second range relative to the information handling system based on the data from the far-field sensor, wherein the data includes data from a camera of the far-field sensor; and
in response to a verification of the user presence status within the first range associated with the near-field sensor, applying a policy based on the user presence status and the media content by adjusting a power mode setting of the information handling system, wherein a power savings mode is applied when the user presence status is not detected, and wherein a normal power mode is restored when the user presence status is detected.

2. The method of claim 1, further comprising determining a user presence state based on the data from the sensors.

3. The method of claim 1, further comprising determining user behavior based on the data from the sensors.

4. The method of claim 1, wherein applying the policy includes adjusting power consumption mode of the information handling system.

5. The method of claim 1, further comprising subsequent to the applying the policy, monitoring the information handling system to detect whether the media application is still playing.

6. The method of claim 1, further comprising determining a second user presence relative to the information handling system.

7. The method of claim 1, wherein the adjusting the setting in the media application includes pausing the playing of the media content.

8. An information handling system, comprising:
a processor; and
a memory coupled to the processor, the memory having instructions stored thereon that, upon execution by the processor, cause the information handling system to:
detect media playback;
in response to a detection of the media playback, collect data from a user presence device and a near-field sensor that provides proximity sensing at a range around the information handling system;
determine user presence relative to the information handling system based on the data from the user presence device; and
apply a policy based on the user presence by adjusting a power mode setting, in response to a verification from another user presence device, wherein power savings mode is applied when the user presence is not detected, and wherein a normal power mode is restored when the user presence is detected.

9. The information handling system of claim 8, wherein the instructions upon the execution by the processor is further configured to cause the information handling system to determine a user presence state based on the data from the user presence device.

10. The information handling system of claim 8, wherein the instructions upon the execution by the processor is further configured to cause the information handling system further to determine user behavior based on the data from the user presence device.

11. The information handling system of claim 8, wherein to apply the policy includes to adjust power consumption mode of the information handling system.

12. The information handling system of claim 8, wherein the instructions upon the execution of the processor is further configured to cause the information handling system further to monitor the information handling system to detect whether the media playback is still running subsequent to the application of the policy.

13. The information handling system of claim 8, wherein the instructions upon execution of the processor is further configured to cause the information handling system further to determine a second user presence based on the data from the user presence device.

14. A non-transitory computer-readable media to store instructions that are executable to perform operations comprising:
in response to detecting whether a media application is playing media content on an information handling system, collecting data from a plurality of sensors, wherein the sensors include a far-field sensor, a near-field sensor, and a voice agent, wherein the near-field sensor provides proximity sensing at a first range around the information handling system, and wherein the far-field sensor provides proximity sensing at a second range around the information handling system;

determining user presence status within the second range relative to the information handling system based on the data from the far-field sensor and the voice agent; and in response to a verification of the user presence status within the first range by the near-field sensor, applying a policy based on the user presence status and the media content by adjusting a setting in the media application, wherein the policy includes adjusting a power mode setting of the information handling system.

15. The non-transitory computer-readable media of claim 14, wherein the operations further comprise determining a user presence state based on the data from the sensors.

16. The non-transitory computer-readable media of claim 14, wherein the operations further comprise determining user behavior based on the data from the sensors.

17. The non-transitory computer-readable media of claim 14, wherein the operations further comprise subsequent to the applying the policy, monitoring the information handling system to detect whether the media application is still playing in the information handling system.

18. The non-transitory computer-readable media of claim 14, wherein applying the policy includes adjusting power consumption mode.

19. The non-transitory computer-readable media of claim 14, wherein the operations further comprise determining a second user presence relative to the information handling system.

20. The non-transitory computer-readable media of claim 14, wherein the operations further comprise subsequent to the applying the policy, monitoring the information handling system to detect whether the media application is playing in the information handling system.

* * * * *